United States Patent
Cook et al.

(10) Patent No.: US 6,673,259 B2
(45) Date of Patent: Jan. 6, 2004

(54) AZEOTROPE-LIKE COMPOSITIONS OF PENTAFLUOROPROPANE

(75) Inventors: Kane D. Cook, Eggertsville, NY (US); Rajiv R. Singh, Getzville, NY (US); Gary M. Knopeck, Lakeview, NY (US); Mary C. Bogdan, Buffalo, NY (US); Hang T. Pham, Amherst, NY (US); Leslie Bement, Buffalo, NY (US); David J. Williams, East Amherst, NY (US); James M. Bowman, Geneva, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/121,194

(22) Filed: Apr. 12, 2002

(65) Prior Publication Data

US 2003/0030032 A1 Feb. 13, 2003

Related U.S. Application Data

(60) Provisional application No. 60/283,455, filed on Apr. 12, 2001.

(51) Int. Cl.[7] .............................. C09K 5/04; C09K 3/00; C23G 5/032; C23G 5/028
(52) U.S. Cl. .......................... 252/67; 252/364; 252/571; 516/8; 516/8.1; 516/10
(58) Field of Search .......................... 252/67, 364, 571, 252/8, 8.1, 10

(56) References Cited

U.S. PATENT DOCUMENTS

| | | | | |
|---|---|---|---|---|
| 2,834,749 | A | 5/1958 | Bailey et al. | .................. 260/42 |
| 2,846,458 | A | 8/1958 | Haluska | .................... 260/448.2 |
| 2,917,480 | A | 12/1959 | Bailey et al. | .................. 260/42 |
| 3,455,840 | A | 7/1969 | Kaoru Kato et al. | ........ 252/441 |
| 5,558,810 | A | * 9/1996 | Minor et al. | .................... 252/67 |
| 5,562,857 | A | * 10/1996 | Werner et al. | ................. 252/67 |
| 5,788,886 | A | 8/1998 | Minor et al. | ................ 252/364 |
| 5,985,939 | A | 11/1999 | Minor | ........................... 516/8 |
| 6,514,928 | B1 | * 2/2003 | Bement et al. | ............. 510/415 |

OTHER PUBLICATIONS

Research Disclosure 39050 in: "Research Disclosure Oct. 1996" (Hampshire, England, Kenneth Mason Publications Ltd, Oct. 10, 1996), pp. 679–680.*

Saunders, J.H. and Frisch, K.C. "Polyurethanes Chemistry and Technology" *Interscience Publishers,* vol. XVI, Part 1, 219–223 & Part II, 193–201.

* cited by examiner

*Primary Examiner*—Matthew A. Thexton
(74) *Attorney, Agent, or Firm*—Colleen D. Szuch; Deborah M. Chess

(57) ABSTRACT

Disclosed are azeotrope-like compositions comprising 1,1,1,3,3-pentafluoropropane and at least one $C_3$ or $C_4$ hydrocarbon, and optionally water, said compositions are environmentally desirable for use as refrigerants, aerosol propellants, metered dose inhalers, blowing agents for polymer foam, heat transfer media, and gaseous dielectrics.

20 Claims, 3 Drawing Sheets

AZEOTROPE-LIKE COMPOSITIONS OF PENTAFLUOROPROPANE

CROSS-REFERENCE TO RELATED APPLICATION

This application claims priority to provisional application Ser. No. 60/283,455 which was filed with the United States Patent Office on Apr. 12, 2001 and which is incorporated herein by reference.

FIELD OF INVENTION

The present invention relates to novel compositions comprising fluorocarbons and hydrocarbons, and to novel compositions comprising fluorocarbons, hydrocarbons and water.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, it is desirable to use fluids having low or even zero ozone depletion potential, such as hydrofluorocarbons ("HFC's").

Thus, the use of fluids that do not contain chlorofluorocarbons ("CFCs") or hydrochlorofluorocarbons ("HCFCs") is desirable. Additionally, it is known that the use of single component fluids or azeotropic mixtures, which mixtures do not fractionate on boiling and evaporation, is desirable. However, the identification of new, environmentally safe, non-fractionating mixtures is complicated due to the fact that azeotrope formation is not readily predictable.

The art continually is seeking new fluorocarbon based mixtures that offer alternatives to, and are considered environmentally safer substitutes for, CFC's and HCFCs. Of particular interest are combinations or mixtures containing a fluorocarbon and a non-fluorocarbon, both of low or no ozone depletion potentials. Such mixtures are the subject of this invention. As used herein, the term fluorocarbon includes CFCs and HCFCs.

SUMMARY

The present inventors have developed several compositions that can help to satisfy the continuing need for substitutes for CFCs and HCFCs. In one embodiment, the present invention provides azeotrope-like compositions comprising pentafluoropropane, at least one $C_4$ hydrocarbon and water. In other embodiments, the present invention provides azeotrope-like compositions comprising pentafluoropropane, preferably 1,1,1,3,3-pentafluoropropane (hereinafter "HFC-245fa"), and from about 1 to less than about 30 percent by weight of isobutane. In yet further embodiments, the present invention provides azeotrope-like compositions comprising pentafluoropropane and propane.

The preferred compositions of the invention provide environmentally desirable, zero ozone depletion potential replacements for currently used CFC's and HCFC's. Additionally, the compositions of the invention exhibit characteristics that make the compositions better CFC and HCFC substitutes than any of HFC-245fa, isobutane, propane or water alone.

DESCRIPTION OF PREFERRED EMBODIMENTS

The Compositions

Figure 1:
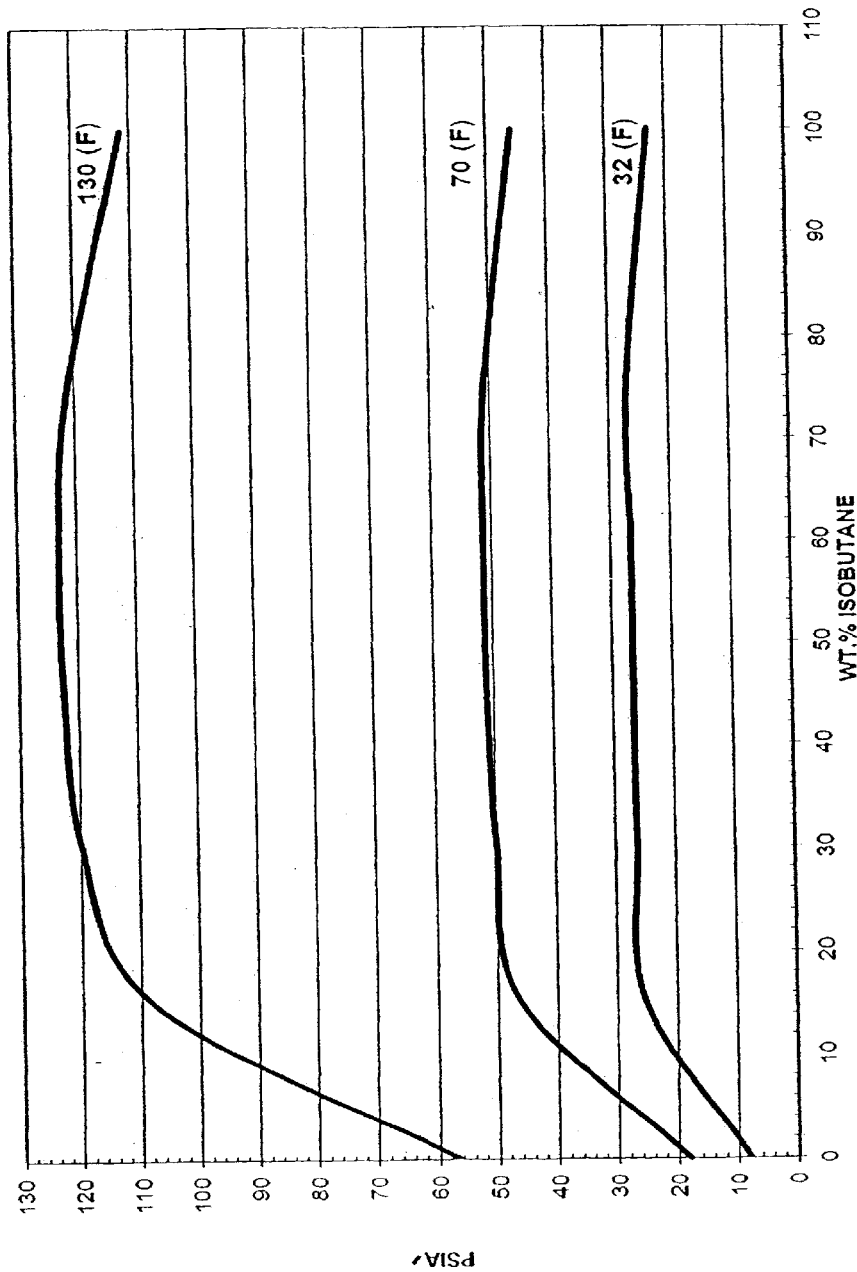
FIG. 1 is a graph of the vapor pressure curve for mixtures of HFC-245fa and isobutane at about 32° F., 70° F. and 130° F.

The present compositions are azeotropes-like compositions. As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the state pressure and temperature. In practice, this means that the components of an azeotropic mixture are constant boiling and cannot be separated during a phase change.

As the term is used herein, "azeotrope-like" compositions behave like azeotropic mixtures, that is, they are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges as well as certain compositions outside these ranges are azeotrope-like.

The azeotrope-like compositions of the invention may include additional components that do not form new azeotropic or azeotrope-like systems, or additional components that are not in the first distillation cut. The first distillation cut is the first cut taken after the distillation column displays steady state operation under total reflux conditions. One way to determine whether the addition of a component forms a new azeotropic or azeotrope-like system so as to be outside of this invention is to distill a sample of the composition with the component under conditions that would be expected to separate a non-azeotropic mixture into its separate components. If the mixture containing the additional component is non-azeotropic or non-azeotrope-like, the additional component will fractionate from the azeotropic or azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

Pentafluoropropane $C_4$ Hydrocarbon/Water

One embodiment of the invention provides azeotrope-like compositions, and preferably heterogenous azeotropic compositions, comprising pentafluoropropane, preferably HFC-245fa, at least one $C_4$ hydrocarbon and water. Although it is contemplated that all $C_4$ hydrocarbons are adaptable for use in the compositions of the present invention, it is generally preferred that the $C_4$ hydrocarbon comprise isobutane or n-butane, and even more preferably consist essentially of isobutane.

Preferably, the novel azeotrope-like compositions of this embodiment comprise effective amounts of the pentafluoropropane, preferably HFC-245fa, the $C_4$ hydrocarbon, and water. The term "effective amounts" as used herein means the amount of each component which upon combination with the other component or components, results in the formation of the present azeotrope-like compositions.

These embodiments preferably provide azeotrope-like compositions comprising, and preferably consisting essentially of, from about 50 to about 98 parts by weight HFC-245fa, from about 1 to about 49 parts by weight of at least one $C_4$ hydrocarbon, and from about 1 to about 49 parts by weight water. In ternary embodiments in which the $C_4$ hydrocarbon is essentially isobutane, such preferred compositions are characterized by a substantially constant boiling point of about −15.17° C., that is about −15.17° C. ±3° C., preferably ±2° C. and more preferably ±1° C., at about 14.25 psia pressure. In embodiments in which the $C_4$ hydrocarbon is essentially normal butane, such preferred compositions are characterized by a substantially constant boiling point of about −7.37° C., that is, about −7.37° C. ±3° C., preferably ±2° C., and more preferably ±1° C., at about 14.25 psia pressure.

The preferred, more preferred, and most preferred compositions of this embodiment are set forth in Table 1. The numerical ranges in Table 1 are to be understood to be prefaced by the term "about".

TABLE 1

| Components | Preferred (pbw) | More Preferred (pbw) | Most Preferred (pbw) |
|---|---|---|---|
| HFC-245fa | 65–98 | 75–98 | 85–98 |
| C$_4$ hydrocarbon | 34–1 | 24–1 | 15–1 |
| Water | 34–1 | 24–2 | 15–3 |

Pentafluoropropane and Isobutane

One embodiment of the invention provides azeotrope-like compositions comprising, and preferably consisting essentially of, pentafluoropropane and isobutane. Preferably, the novel azeotrope-like compositions of this embodiment comprise effective amounts of the pentafluoropropane, preferably HFC-245fa, and isobutane. Such compositions preferably comprise, and even more preferably consist essentially of, from about 70 to about 99 parts by weight HFC-245fa, and from about 1 to less than about 30 parts by weight of isobutane. In many embodiments, such preferred compositions are characterized by a substantially constant boiling point of about −15.17 ° C., that is about −15.17° C.±3° C., preferably ±2° C., and preferably ±1° C., at about 14.25 psia pressure.

The preferred, more preferred, and most preferred compositions of this embodiment are set forth in Table 2A. The numerical ranges in Table 2A are to be understood to be prefaced by the term "about".

TABLE 2A

| Components | Preferred (pbw) | More Preferred (pbw) | Most Preferred (pbw) |
|---|---|---|---|
| HFC-245fa | 71–98 | 71–90 | 71–80 |
| Isobutane | 29–2 | 29–10 | 29–20 |

The vapor pressure curve for this embodiment of the invention is illustrated in FIG. 1.

The following Table 2B provides vapor pressure data for the HFC-245fa/isobutane compositions according to preferred embodiments of the present invention.

TABLE 2B

HFC-245fa/iso-Butane Azeotrope

| | Vapor Pressure (psia) | | |
|---|---|---|---|
| 245fa/iso-Butane Weight Ratios | 32° F. | 70° F. | 130° F. |
| 100/0 | 7.86 | 18.03 | 56.27 |
| 84.83/15.17 | 25.27 | 46.14 | 107.79 |
| 69.80/30.20 | 26.29 | 49.89 | 119.81 |
| 54.75/45.25 | 26.53 | 51.15 | 122.46 |
| 40.08/59.92 | 26.49 | 51.32 | 122.93 |
| 25.27/74.73 | 26.93 | 50.90 | 121.23 |
| 0/100 | 22.91 | 45.69 | 111.55 |

Note:
actual temperatures are 32.13° F., 69.78° F. and 129.99° F.

Pentafluoropropane and n-Butane

Another embodiment of the invention provides azeotrope-like compositions comprising, and preferably consisting essentially of, pentafluoropropane and normal butane. Preferably, the novel azeotrope-like compositions of this embodiment comprise effective amounts of the pentafluoropropane, preferably HFC-245fa, and n-butane. In many embodiments, such preferred compositions are characterized by a substantially constant boiling point of about −7.37° C., that is, about −7.37° C.±3° C., preferably ±2° C., and more preferably ±1° C., at about 14.39 psia pressure.

Figure 2:
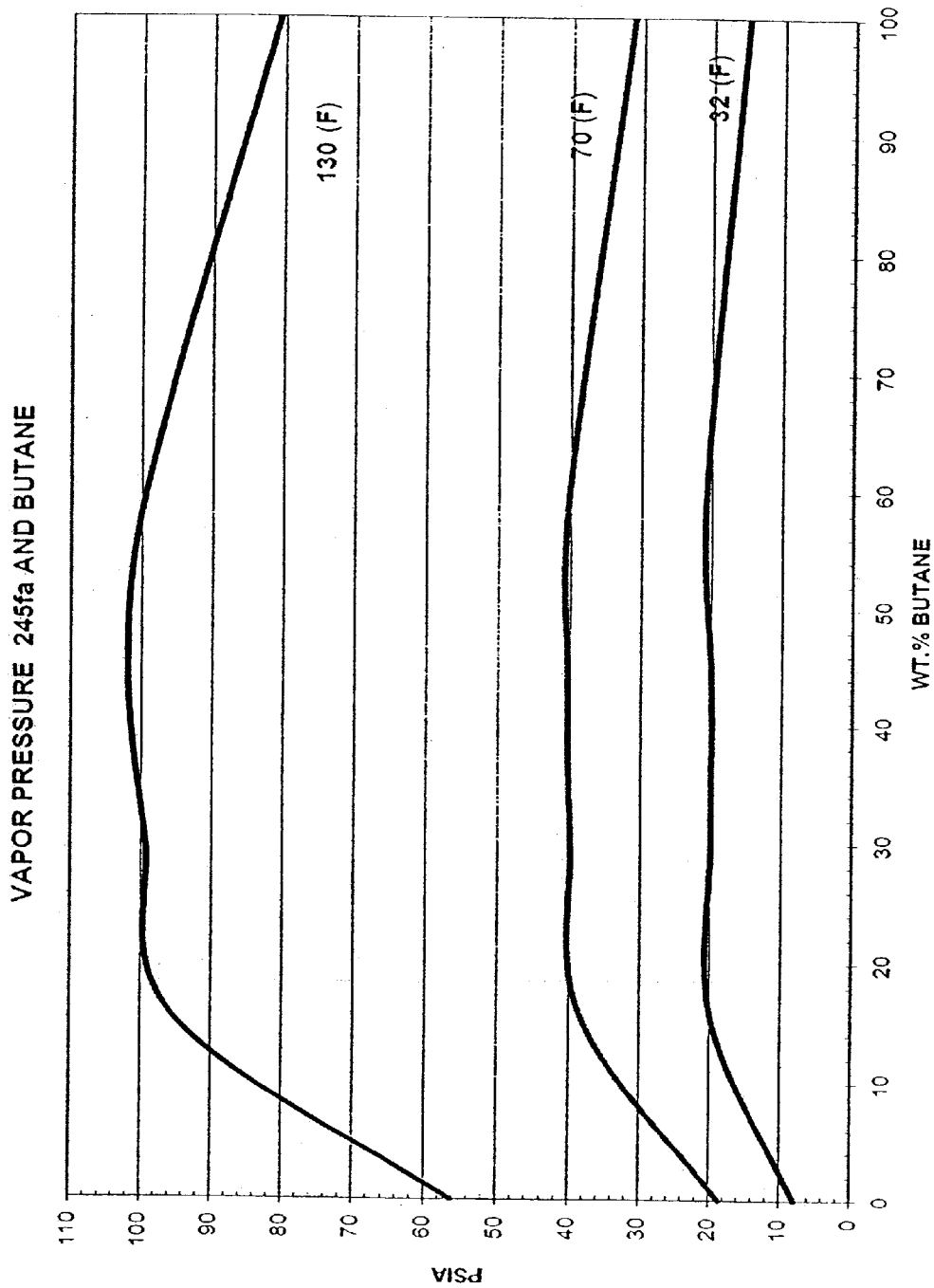
FIG. 2 is a graph of the vapor pressure curve for mixtures of HFC-245fa and n-butane at about 32° F., 70° F. and 130° F.

The vapor pressure curve for this embodiment of the invention is illustrated in FIG. 2.

The following Table 3 provides vapor pressure data for the HFC-245fa/n-butane compositions according to preferred embodiments of the present invention.

TABLE 3

HFC-245fa/n-Butane Azeotrope

| | Vapor Pressure (psia) | | |
|---|---|---|---|
| 245fa/Butane Weight Ratios | 32° F. | 70° F. | 130° F. |
| 100/0 | 7.86 | 18.59 | 56.16 |
| 84.67/15.33 | 19.90 | 38.24 | 95.34 |
| 69.84/30.16 | 19.93 | 39.24 | 99.39 |
| 55.42/44.58 | 19.94 | 40.33 | 101.94 |
| 40.10/59.90 | 20.72 | 40.14 | 99.36 |
| 0/100 | 14.99 | 31.32 | 80.88 |

Note:
actual temperatures are 31.95° F., 69.75° F. and 129.95° F.

Pentafluoropropane and Propane

One embodiment of the invention provides azeotrope-like compositions comprising, and preferably consisting essentially of, pentafluoropropane and propane. As used herein, the term "propane" refers to straight chain propane, specifically excluding cyclopropane. Preferably, the novel azeotrope-like compositions of this embodiment comprise effective amounts of the pentafluoropropane, preferably HFC-245fa, and propane. Such compositions preferably comprise, and even more preferably consist essentially of, from about 1 to about 99 parts by weight HFC-245fa, and from about 1 to about 99 parts by weight of propane. In many embodiments, such preferred compositions are characterized by a substantially constant vapor pressure of about 123 psia±3 psia, preferably ±2 psia, at about 70° F.

The preferred, more preferred, and most preferred compositions of this embodiment are set forth in Table 4A. The numerical ranges in Table 4A are to be understood to be prefaced by the term "about".

TABLE 4A

| Components | Preferred (pbw) | More Preferred (pbw) | Most Preferred (pbw) |
|---|---|---|---|
| HFC-245fa | 1–85 | 1–70 | 1–30 |
| Propane | 15–99 | 30–99 | 70–99 |

Figure 3:
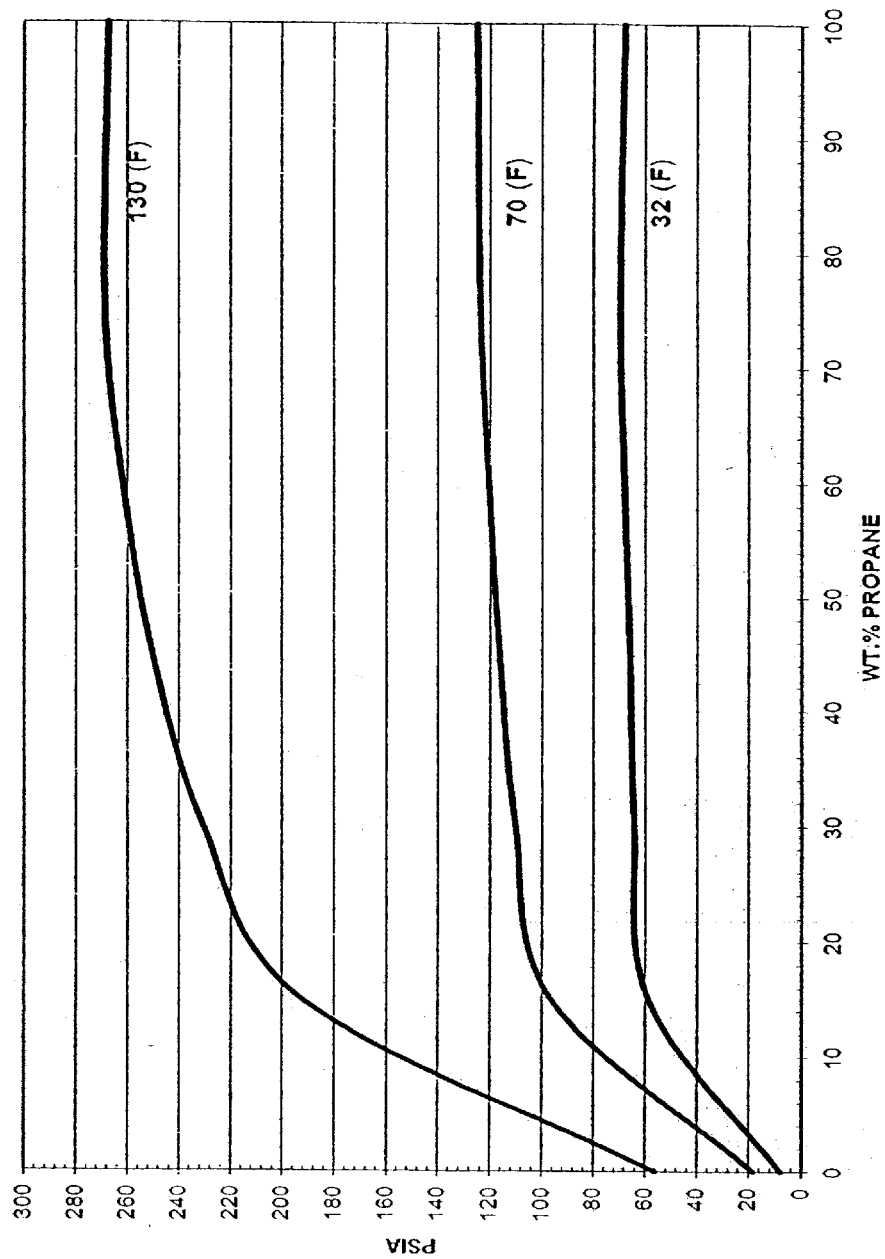
FIG. 3 is a graph of the vapor pressure curve for mixtures of HFC-245fa and propane at about 32° F., 70° F. and 130° F.

The vapor pressure curve for this embodiment is illustrated in FIG. 3.

The following Table 4B provides vapor pressure data for the HFC-245fa/propane compositions according to preferred embodiments of the invention.

TABLE 4B

HFC-245fa/n-Propane Azeotrope

| | Vapor Pressure (psia) | | |
|---|---|---|---|
| 245fa/Propane Weight Ratios | 32° F. | 70° F. | 130° F. |
| 100/0 | 7.86 | 18.02 | 56.26 |
| 85.08/14.92 | 58.52 | 96.23 | 192.08 |
| 69.83/30.17 | 64.18 | 110.24 | 231.06 |
| 54.91/45.09 | 65.80 | 116.28 | 250.47 |
| 40.18/59.82 | 67.96 | 120.29 | 261.66 |
| 24.87/75.13 | 69.52 | 123.62 | 268.51 |
| 0/100 | 67.86 | 124.89 | 267.23 |

Note:
actual temperatures are 32.13° F., 69.76° F. and 129.97° F.

Uses of the Compositions

The present compositions have utility in numerous applications.

For example, one embodiment of the present invention relates to a blowing agent comprising one or more of the azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. The present methods preferably comprise providing such a foamable composition and reacting it under conditions effective to obtain a foam, and preferably a closed cell foam. The invention also relates to foam, and preferably closed cell foam, prepared from a polymer foam formulation containing a blowing agent comprising the azeotrope-like composition of the invention.

Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention. In general, such preferred methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives. It is convenient in many applications to provide the components for polyurethane or polyisocyanurate foams in pre-blended formulations. Most typically, the foam formulation is pre-blended into two components. The isocyanate and optionally certain surfactants and blowing agents comprise the first component, commonly referred to as the "A" component. The polyol or polyol xture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B-component as described above.

Azeotrope-like mixtures containing HFC-245fa in accordance with the present invention are particularly suitable as foam blowing agents since foams blown with HFC-245fa have been found to possess low relative initial and aged thermal conductivity and good dimensional stability at low temperatures. Of particular interest are those azeotrope-like compositions of the present invention that optionally further contain other zero ozone depleting materials, such as, for example, other hydrofluorocarbons, e.g., difluoromethane (HFC-32); difluoroethane (HFC-152); trifluoroethane (HFC-143); tetrafluoroethane (HFC-134); pentafluoroethane (HFC-125); pentafluoropropane (HFC-245); hexafluoropropane (HFC-236); heptafluoropropane (HFC-227); pentafluorobutane (HFC-365) and inert gases, e.g., air, nitrogen, carbon dioxide. Where isomerism is possible for the hydrofluorocarbons mentioned above, the respective isomers may be used either singly or in the form of a mixture.

Dispersing agents, cell stabilizers, and surfactants may also be incorporated into the blowing agent mixture. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917, 480, and 2,846,458. Other optional additives for the blowing agent mixture may include flame retardants such as tri(2-chloroethyl)phosphate, tri(2-chloropropyl)phosphate, tri(2, 3-dibromopropyl)-phosphate, tri(1,3-dichloropropyl) phosphate, diammonium phosphate, various halogenated aromatic compounds, antimony oxide, aluminum trihydrate, polyvinyl chloride, and the like.

Generally speaking, the amount of blowing agent present in the blended mixture is dictated by the desired foam densities of the final polyurethane or polyisocyanurate foams products. The proportions in parts by weight of the total blowing agent or blowing agent blend can fall within the range of from 1 to about 60 parts of blowing agent per 100 parts of polyol. Preferably from about 10 to about 35 parts by weight of the present composition per 100 parts by weight of polyol are used.

In another embodiment, the azeotrope-like compositions of this invention may be used as propellants in sprayable compositions, either alone or in combination with known propellants. The sprayable composition comprises, consists essentially of, and consists of a material to be sprayed and a propellant comprising, consisting essentially of, and consisting of the azeotrope-like compositions of the invention. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications.

The components of the composition of the invention are known materials that are commercially available or may be prepared by known methods. Preferably, the components are of sufficiently high purity so as to avoid the introduction of adverse influences upon cooling or heating properties, constant boiling properties, or blowing agent properties of the system. In the case of metered dose inhalers, the relevant current Good Manufacturing Process may be used for manufacturing these materials.

Additional components may be added to tailor the properties of the azeotrope-like compositions of the invention as needed. By way of example, oil solubility aids may be added in the case in which the compositions of the invention are used as refrigerants. Stabilizers and other materials may also be added to enhance the properties of the compositions of the invention.

EXAMPLE 1

100 g of a polyether with a hydroxyl value of 380, a result from the addition of propylene oxide to a solution of saccharose, propylene glycol and water, is mixed with 2 g of a siloxane polyether copolymer as foam stabilizer, and 3 g of dimethylcyclohexylamine. With stirring, 100 g of the mixture is thoroughly mixed with 15 g of an azeotrope-like composition of the present invention as blowing agent. The resulting mixture is foamed with 152 g of crude 4,4' diisocyanatodiphenylmethane. The resulting rigid foam is inspected and found to be of good quality.

What is claimed is:

1. An azeotrope-like composition consisting essentially of 1,1,1,3,3-pentafluoropropane, water and n-butane.

2. The azeotrope-like composition of claim 1 consisting essentially of from about 65 to about 98 weight percent 1,1,1,3,3-pentafluoropropane from about 1 to about 34 weight percent water and from about 1 to about 34 weight percent of n-butane, said composition having a boiling point of about −7.370° C. at about 14.25 psia.

3. The azeotrope-like composition of claim 2 consisting essentially of from about 75 to about 97 weight percent 1,1,1,3,3-pentafluoropropane from about 2 to about 24 weight percent water and from about 1 to about 24 weight percent of n-butane.

4. The azeotrope-like composition of claim 3 consisting essentially of from about 85 to about 96 weight percent 1,1,1,3,3-pentafluoropropane, from about 3 to about 15 weight percent water and from about 1 to about 15 weight percent of n-butane.

5. A premix of polyol and a blowing agent comprising an azeotrope-like composition according to claim 1.

6. A blowing agent comprising an azeotrope-like composition according to claim 1.

7. A sprayable composition comprising a material to be sprayed and a propellant comprising an azeotrope-like composition according to claim 1.

8. The sprayable composition according to claim 7 wherein the sprayable composition is an aerosol.

9. The sprayable composition according to claim 7 wherein the sprayable composition is a cosmetic material.

10. A sprayable composition according to claim 7 wherein the material to be sprayed is a medicinal material.

11. An azeotrope-like composition consisting essentially of 1,1,1,3,3-pentafluoropropane and propane.

12. The azeotrope-like composition of claim 11 consisting essentially of from about 1 to about 85 weight percent 1,1,1,3,3-pentafluoropropane and from about 15 to about 99 weight percent propane, said composition having a vapor pressure of about 123 psia ±3 psia at about 70° F.

13. The azeotrope-like composition of claim 12 consisting essentially of from about 1 to about 70 weight percent 1,1,1,3,3-pentafluoropropane and from about 30 to about 99 weight percent propane.

14. The azeotrope-like composition of claim 13 consisting essentially of from about 1 to about 30 weight percent 1,1,1,3,3-pentafluoropropane and from about 70 to about 99 weight percent propane.

15. A premix of a polyol and a blowing agent comprising an azeotrope-like composition according to claim 11.

16. A blowing agent comprising an azeotrope-like composition according to claim 11.

17. A sprayable composition comprising a material to be sprayed and a propellant comprising an azeotrope-like composition according to claim 11.

18. A sprayable composition according to claim 17 wherein the sprayable-composition is an aerosol.

19. A sprayable composition according to claim 17 wherein the sprayable composition is a cosmetic material.

20. A sprayable composition according to claim 17 wherein the material to be sprayed is a medicinal material.

* * * * *